(12) United States Patent
Khalid et al.

(10) Patent No.: US 12,497,904 B2
(45) Date of Patent: Dec. 16, 2025

(54) GAS TURBINE ENGINE

(71) Applicant: General Electric Company, Schenectady, NY (US)

(72) Inventors: Syed Khalid, Mason, OH (US); David Marion Ostdiek, Liberty Township, OH (US); Jeffrey S. Spruill, Hillsboro, OH (US); Daniel Lawrence Tweedt, West Chester, OH (US); William Joseph Solomon, Montgomery, OH (US); Brandon Wayne Miller, Liberty Township, OH (US); Randy M. Vondrell, Newport, KY (US); Kevin Edward Hinderliter, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/678,000

(22) Filed: May 30, 2024

(65) Prior Publication Data
US 2024/0401491 A1  Dec. 5, 2024

Related U.S. Application Data

(60) Provisional application No. 63/505,789, filed on Jun. 2, 2023.

(51) Int. Cl.
*F01D 9/04* (2006.01)
*F01D 5/14* (2006.01)

(52) U.S. Cl.
CPC ............. *F01D 9/041* (2013.01); *F01D 5/145* (2013.01); *F05D 2220/36* (2013.01); *F05D 2250/51* (2013.01)

(58) Field of Classification Search
CPC . Y02T 50/10; Y02T 50/60; F02C 7/04; F02C 7/32; F02C 7/18; F02C 3/067; F02C 7/185; F02C 7/12; F02C 7/16; F01D 9/02; F01D 25/12; F01D 1/02; F01D 5/02; F01D 5/143; F01D 5/145; F01D 9/041; F01D 9/065; F01D 9/06; F05D 2260/213; F05D 2220/323; F05D 2220/36; F05D 2250/51; F05D 2250/71; F05D 2270/17; B64D 2027/005; F05B 2240/12
See application file for complete search history.

(56) References Cited

U.S. PATENT DOCUMENTS

| | | |
|---|---|---|
| 4,446,696 A | 5/1984 | Sargisson et al. |
| 5,039,278 A | 8/1991 | Wakeman et al. |

(Continued)

FOREIGN PATENT DOCUMENTS

CN  105508054 A  4/2016

*Primary Examiner* — Eric J Zamora Alvarez
(74) *Attorney, Agent, or Firm* — Dority & Manning, P.A.

(57) ABSTRACT

A gas turbine engine is provided, comprising: a turbomachine having a compressor section, a combustion section, and a turbine section in serial flow order; and a fan section having a fan drivingly coupled to the turbomachine and an airflow surface rotatable with the fan and exposed to a fan airflow provided to and through the fan during operation of the gas turbine engine, the airflow surface defining a plurality of boundary layer openings configured to ingest a boundary layer of the fan airflow over the airflow surface during operation of the gas turbine engine.

13 Claims, 11 Drawing Sheets

(56) References Cited

U.S. PATENT DOCUMENTS

| | | |
|---|---|---|
| 7,665,310 B2 | 2/2010 | Laborie |
| 9,127,566 B2 * | 9/2015 | Suciu ........................ F01D 9/02 |
| 9,920,708 B2 * | 3/2018 | Suciu ................... F01D 25/125 |
| 10,704,410 B2 | 7/2020 | Zatorski et al. |
| 11,098,646 B2 * | 8/2021 | Macchia ................. F02C 7/047 |
| 11,572,827 B1 | 2/2023 | Khalid et al. |
| 11,585,354 B2 | 2/2023 | Miller et al. |
| 11,608,743 B1 | 3/2023 | Tweedt et al. |
| 11,639,671 B2 | 5/2023 | Glessner et al. |
| 2024/0218829 A1 * | 7/2024 | Pal ........................... F02C 7/16 |
| 2024/0318613 A1 * | 9/2024 | Miller ....................... F02K 3/06 |

* cited by examiner

GAS TURBINE ENGINE

CROSS-REFERENCE TO RELATED APPLICATIONS

This application is a non-provisional application claiming the benefit of priority under 35 U.S.C. § 119(e) to U.S. Provisional Application No. 63/505,789, filed Jun. 2, 2023, which is hereby incorporated by reference in its entirety.

FIELD

The present disclosure relates to a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Improvements to increase efficiency of the gas turbine engine would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
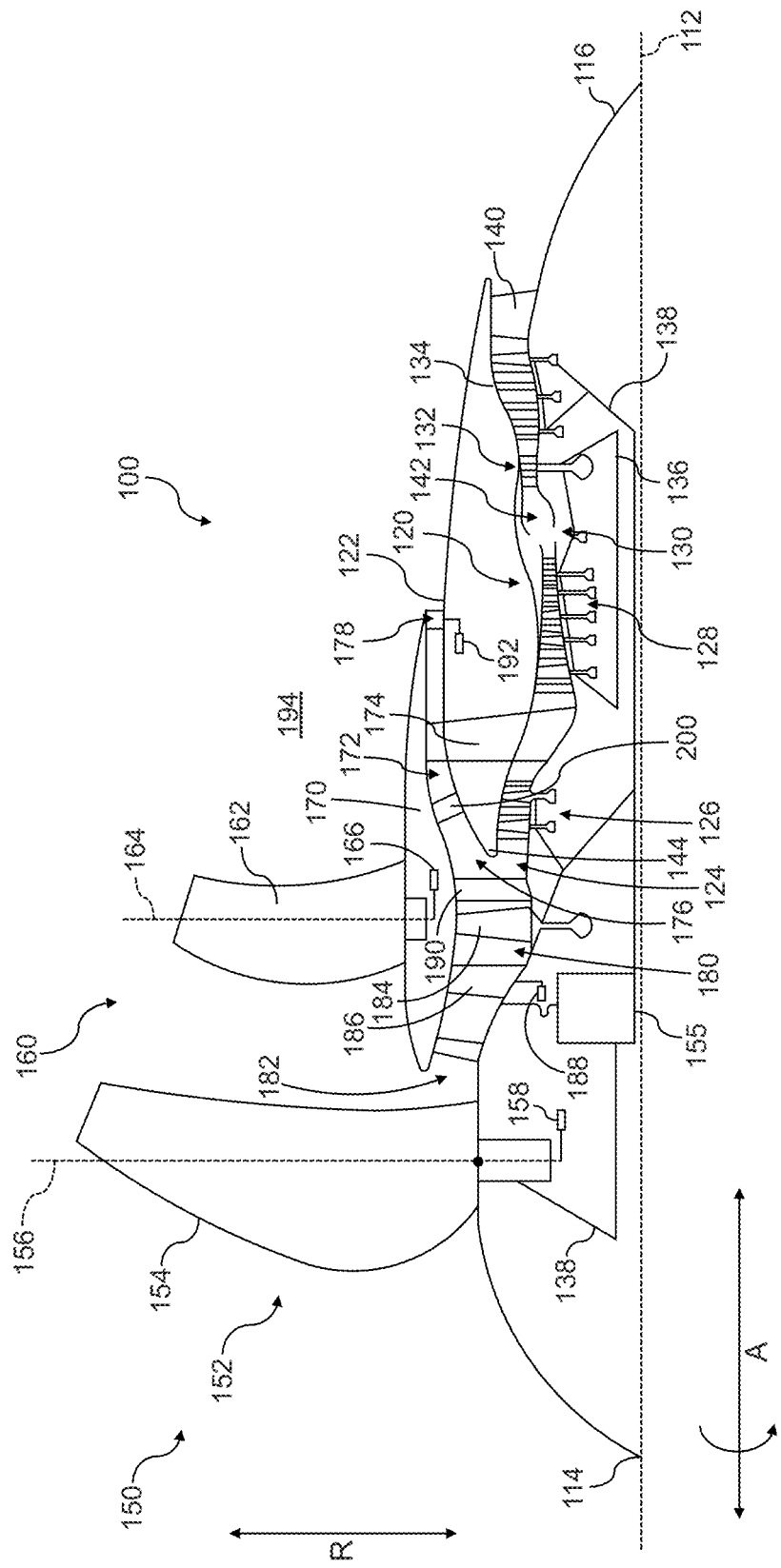
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees fahrenheit (such as less than 300 degrees fahrenheit, such as less than 250 degrees fahrenheit, such as less than 200 degrees fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The term "proximate" refers to being closer to one end than an opposite end. For example, when used in conjunction with first and second ends; high pressure and low pressure sides; or the like, the phrase "proximate the first end," or "proximate the high pressure side," refers to a location closer to the first end than the second end, or closer to the high pressure side than the low pressure side, respectively.

The present disclosure is generally directed to a gas turbine engine, such as a turbofan engine, having a turbomachine and a rotor assembly, or fan section. The turbomachine generally includes, in serial flow order, a compressor section, a combustion section, a turbine section, and an exhaust section. The fan section generally includes a fan with a single stage of unducted rotor blades and a nose cone or spinner. The fan may therefore be referred to as an open rotor or un-ducted fan. The fan typically includes an array of fan blades secured to the hub and rotatable about a longitudinal axis of the turbofan engine. For un-ducted fans to operate efficiently at desirable flight speeds, a large hub or spinner is required, which is unique as compared to ducted fans having inlets formed at least in part by an outer nacelle enclosing the fan, with the inlets operable to reduce the flow velocity into the fan versus flight speed, align an inlet airflow, etc. However, un-ducted fans do not have the ability to reduce the flow velocity and/or to modify the inlet airflow direction in this manner. The relatively large hub or spinner allows for such a benefit.

An adverse effect of the relatively large hub or spinner, however, is that there is an increased surface area for the inlet airflow to travel over, which can cause a boundary layer of weak flow to develop along the hub or spinner prior to entering a compressor of the turbomachine. This boundary layer is a distortion that can reduce efficiency and stall margin of the turbofan engine.

As used herein, "distortion" is generally defined as a variation in the radial velocity profile of flow at a given location. A corresponding definition is the variation in the radial total pressure profile. Circumferential distortion can also exist when the engine is at non-zero angle of attack to flight path. As weak, boundary layer flow is removed from the hub in accordance with one or more embodiments of the present disclosure, the remaining inlet flow profile becomes more uniform.

Accordingly, the present disclosure is directed to a gas turbine engine having: a turbomachine including a compressor section, a combustion section, and a turbine section in serial flow order; and a fan section having a fan drivingly coupled to the turbomachine. The fan section further includes an airflow surface rotatable with the fan and exposed to a fan airflow provided to and through the fan during operation of the gas turbine engine. The airflow surface defines a plurality of boundary layer openings configured to ingest a boundary layer of the fan airflow over the airflow surface during operation of the gas turbine engine. In such a manner, the boundary layer openings may remove a portion of the boundary layer of the incoming flow (fan flow provided to the turbomachine), resulting in a more uniform and higher speed flow provided to a compressor of the turbomachine.

In an alternative embodiment, the present disclosure provides for a gas turbine engine additionally including an inlet section located downstream of the fan and upstream of the compressor section of the turbomachine. The inlet section includes an inner liner along the radial direction of the gas turbine engine, the inner liner defining a boundary layer opening for receiving a boundary layer airflow during operation of the gas turbine engine. A scoop may be provided associated with the boundary layer opening to increase an amount of boundary layer airflow removed. In such a manner, the boundary layer opening may remove a portion of the boundary layer of the incoming flow (fan flow provided through the inlet section to the turbomachine), resulting in a more uniform and higher speed flow provided to the turbomachine. The boundary layer opening defined by the inner liner may be in addition to, or in the alternative to, the boundary layer openings defined by the airflow surface.

In another alternative embodiment, the present disclosure provides for a gas turbine engine additionally or alternatively including an airflow injection assembly. The airflow injection assembly includes an airflow injection nozzle coupled to the inner liner of the inlet section and oriented in the downstream direction. In such a manner, the airflow injection nozzle may re-energize a portion of the boundary layer of the incoming flow (fan flow provided through the inlet section to the turbomachine), resulting in a more uniform and higher speed flow provided to the turbomachine.

Reducing or re-energizing the boundary layer of the inlet airflow in accordance with one or more of the above embodiments provides for an airflow entering a compressor of the turbomachine with a more uniform radial aerodynamic profile. The more uniform the flow, the less constrained the immediately downstream stator vanes and rotor blades become. Lower acoustic source opportunities via either achieving same core/mid-fan flows at lower rotation speeds may translate to a reduction in aerodynamic losses within the compressor section, lower fan speeds, and/or reduced self and interaction fan noise sources. Moreover, by removing and/or re-energizing at least some of the boundary layer of the inlet airflow, unsteadiness from the boundary layer into a mid-fan stream can also be reduced. Turbulence intensity informs source radiation strength both on mid-fan inlet guide vanes as well as core stream inlet noise sources.

Accordingly, the present disclosure provides many advantages over the prior configurations. In particular, one or more of the configurations disclosed herein may be configured to reduce or eliminate a thick boundary layer formation along the larger hub in an un-ducted fan. Accordingly, IGV, mid-fan rotor, and variable IGV design constraints for distortion and stall margin can be eased, thereby improving design flexibility of the engine.

In other embodiments, one or more of the configurations disclosed herein can also be implemented with engines without a mid-fan, such as a turboprop engine. In certain embodiments, one or more of the configurations disclosed herein provides an opportunity for performance improvement or envelope expansion.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet section having an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 198 may be positioned in thermal communication with the fan duct 172. For example, one or more heat exchangers 198 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 198 may be an annular heat exchanger extending substantially 360 degrees in the fan duct 172 (e.g., at least 300 degrees, such as at least 330 degrees). In such a manner, the heat exchanger 198 may effectively utilize the air passing through the fan duct 172 to cool one or more systems of the engine 100 (e.g., lubrication oil systems, compressor bleed air, electrical components, etc.). The heat exchanger 198 uses the air passing through duct 172 as a heat sink and correspondingly increases the temperature of the air downstream of the heat exchanger 198 and exiting the fan exhaust nozzle 178.

Figure 2:
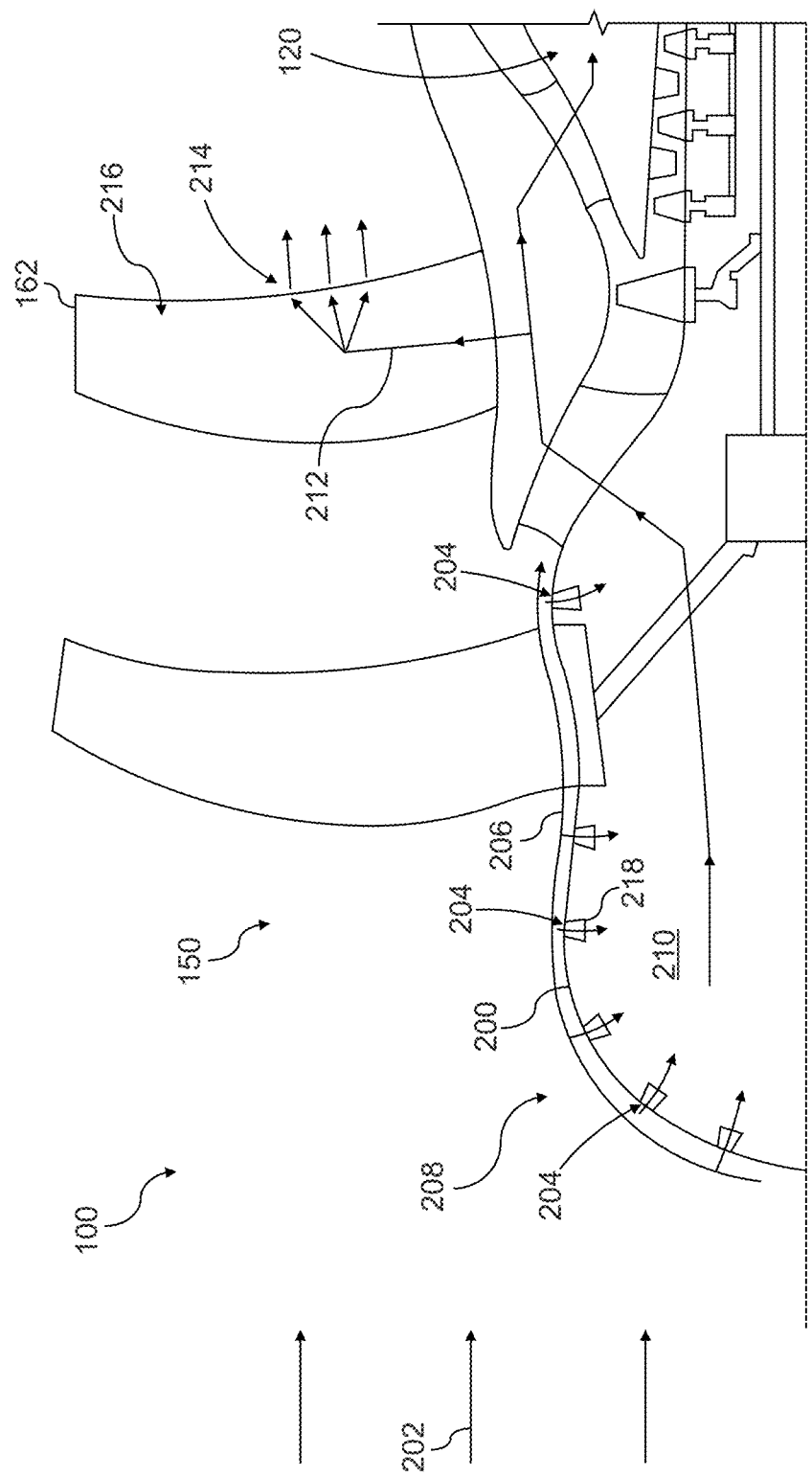
FIG. 2 is a close-up, schematic view of a gas turbine engine in accordance with another exemplary aspect of the present disclosure.

Referring now to FIG. 2, a close-up, schematic view is provided of an engine 100 in accordance with the present disclosure. The exemplary engine 100 of FIG. 2 may be configured in a similar manner as the exemplary engine 100 of FIG. 1, and the same or similar numbers refer to the same or similar parts.

For example, the exemplary engine 100 of FIG. 2 generally includes a turbomachine 120 having a compressor section, a combustion section (see FIG. 1), and a turbine section (see FIG. 1) in serial flow order. The engine 100 further includes a fan section 150 having a fan 152 drivingly coupled to the turbomachine 120. The fan 152 is an unducted fan having a single stage of unducted rotor blades 154.

The fan section 150 further includes an airflow surface 200 rotatable with the fan 152 and exposed to an inlet airflow 202 (e.g., a fan airflow) provided to and through the fan 152 during operation of the gas turbine engine 100. The airflow surface 200 defines a plurality of boundary layer openings 204 configured to ingest a boundary layer 206 of the inlet airflow 202 over the airflow surface 200 during operation of the gas turbine engine 100.

In certain exemplary aspects, the gas turbine engine 100 defines an axial direction A, and the plurality of boundary layer openings 204 are spaced along the axial direction A. More specifically, for the embodiment depicted, the plurality of boundary layer openings 204 includes one or more boundary layer openings 204 located forward of the fan 152. More specifically, still, the plurality of boundary layer openings 204 includes one or more boundary layer openings 204 located aft of the fan 152. Accordingly, it will be appreciated that for the embodiment depicted, the plurality of boundary layer openings 204 includes one or more boundary layer openings 204 located forward of the fan 152 and one or more boundary layer openings 204 located aft of the fan 152.

Referring still to FIG. 2, it will be appreciated that the airflow surface 200 forms at least in part a nose cone 208 for the gas turbine engine 100 (sometimes also referred to as a spinner). The nose cone 208 defines an internal cavity 210, and the plurality of boundary layer openings 204 are in airflow communication with the internal cavity 210. In such a manner, the boundary layer openings 204 may provide a portion of the boundary layer 206 through the airflow surface 200 and into the internal cavity 210.

Briefly, referring still to FIG. 2, it will be appreciated that the gas turbine engine 100 further includes a plurality of stationary outlet guide vanes 162 located downstream of the fan 152. For the embodiment depicted, each stationary outlet guide vane 162 of the plurality of stationary outlet guide vanes 162 defines an OGV internal passage 212, wherein the internal cavity 210 of the nose cone 208 is in fluid communication with the OGV internal passages 212 of the plurality of outlet guide vanes 162. In particular, for the embodiment depicted, each stationary outlet guide vane 162 of the plurality of stationary outlet guide vanes 162 defines an outlet 214 at a trailing edge 216 fluidly coupled to the respective OGV internal passage 212. In such a manner, the boundary layer 206 of the airflow received through the boundary layer openings 204 may be used by the engine 100 to create thrust by injecting the flow into a bypass passage 194 of the engine 100.

Notably, the engine 100 may additionally or alternatively provide the boundary layer 206 of the airflow received through the boundary layer openings 204 to a downstream location (see FIGS. 12 through 14), to various engine compartments for ventilation purposes, to various engine components for thermal management purposes (e.g., cooling), etc.

Figure 3:
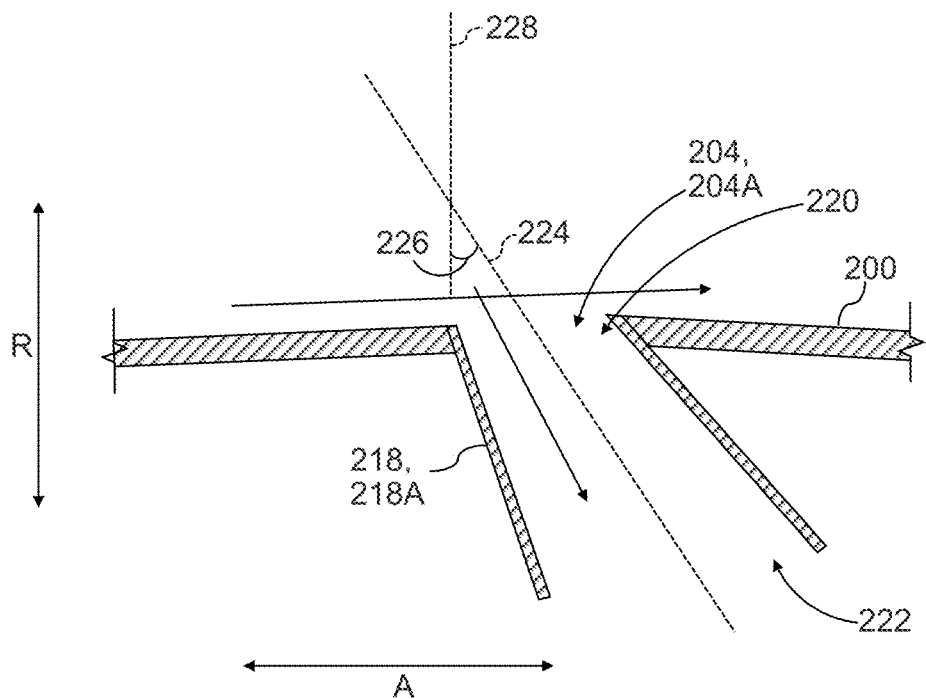
FIG. 3 is a close-up view of a first boundary layer opening of a plurality of boundary layer openings of FIG. 2.

Referring now also to FIG. 3, providing a close-up view of a first boundary layer opening 204A of the plurality of boundary layer openings 204 of FIG. 2, it will be appreciated that the fan section 150 further includes a plurality of diffusers 218, wherein each diffuser 218 is associated with a respective one of the plurality of boundary layer openings 204.

For example, referring particularly to FIG. 3, it will be appreciated that the plurality of diffusers 218 includes a first diffuser 218A associated with the first boundary layer opening 204A, wherein the first diffuser 218A includes an inlet 220 located at the first boundary layer opening 204A and an outlet 222. An area ratio between the outlet 222 and the inlet 220 is greater than 1:1 and up to 6:1. For example, in certain exemplary embodiments, the area ratio is between 2:1 and 4:1. Inclusion of the diffusers 218 may reduce a loss in the flow of the boundary layer 206 through the boundary layer openings 204, such that the a pressure loss in the flow is minimized. More specifically, inclusion of the diffusers 218 with the boundary layer openings 204 may raise a static pressure of the airflow through each respective opening 204 and diffuser 218 to above an ambient static pressure to allow for discharge of the extracted boundary layer air 206 to an ambient location in at least certain exemplary embodiments, or otherwise to allow for an easier reintroduction of such airflow (as discussed herein).

Further for the embodiment of FIG. 3, the first diffuser 218A defines a mean airflow direction 224 from the inlet 220 to the outlet 222, and wherein the mean airflow direction 224 defines an angle 226 with a reference plane 228 defined by a radial direction R and a circumferential direction C (see FIG. 4) greater than 0 degrees and less than 60 degrees. In certain exemplary embodiments, the angle 226 may be between 10 degrees and 50 degrees. In such a manner, the diffusers 218 may be oriented in a downstream direction. Such a configuration may further reduce a loss in the airflow.

Figure 4:
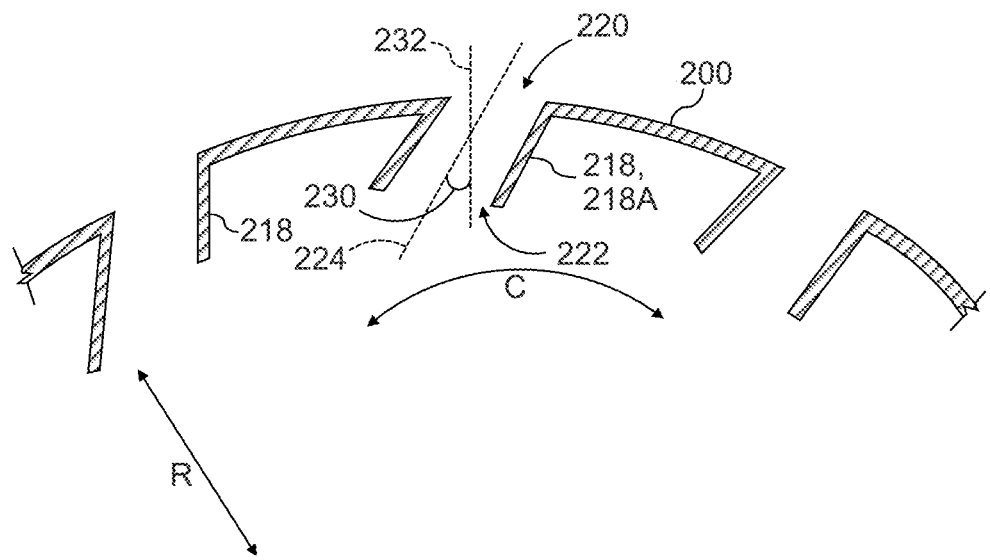
FIG. 4 is a schematic, cross-sectional view of a nose cone at the first boundary layer opening in FIG. 3.

Referring now to FIG. 4, a schematic, cross-sectional view is provided of the nose cone 208 at the first boundary layer opening 204A and first diffuser 218A, showing that in at least the embodiment depicted, the plurality of boundary layer openings 204 are further spaced along the circumferential direction C. Further, for the embodiment depicted, it will be appreciated that the mean airflow direction 224 further defines an angle 230 with a reference plane 232 defined by a radial direction R and an axial direction A (see FIG. 3) greater than 0 degrees and less than 60 degrees. In certain exemplary embodiments, the angle 230 is between 10 degrees and 50 degrees.

As will be appreciated from the views of FIGS. 3 and 4, the mean airflow direction 224 defined by the first diffuser 218A is at a compound angle (i.e., defines an angle greater than 0 with both the reference plane 228 and reference plane 232. The compound angle may allow for more effective extraction of the boundary layer of airflow from the spinning surface and forward-moving surface. The compound angle may be determined based on an axial location of the boundary layer opening 204, as well as an expected circumferential velocity at the boundary layer opening location. In such a manner, it will be appreciated that the boundary layer openings 204 may define unique compound angles (e.g., angles 226a and/or 230) at different locations along axial direction A.

Figure 5:
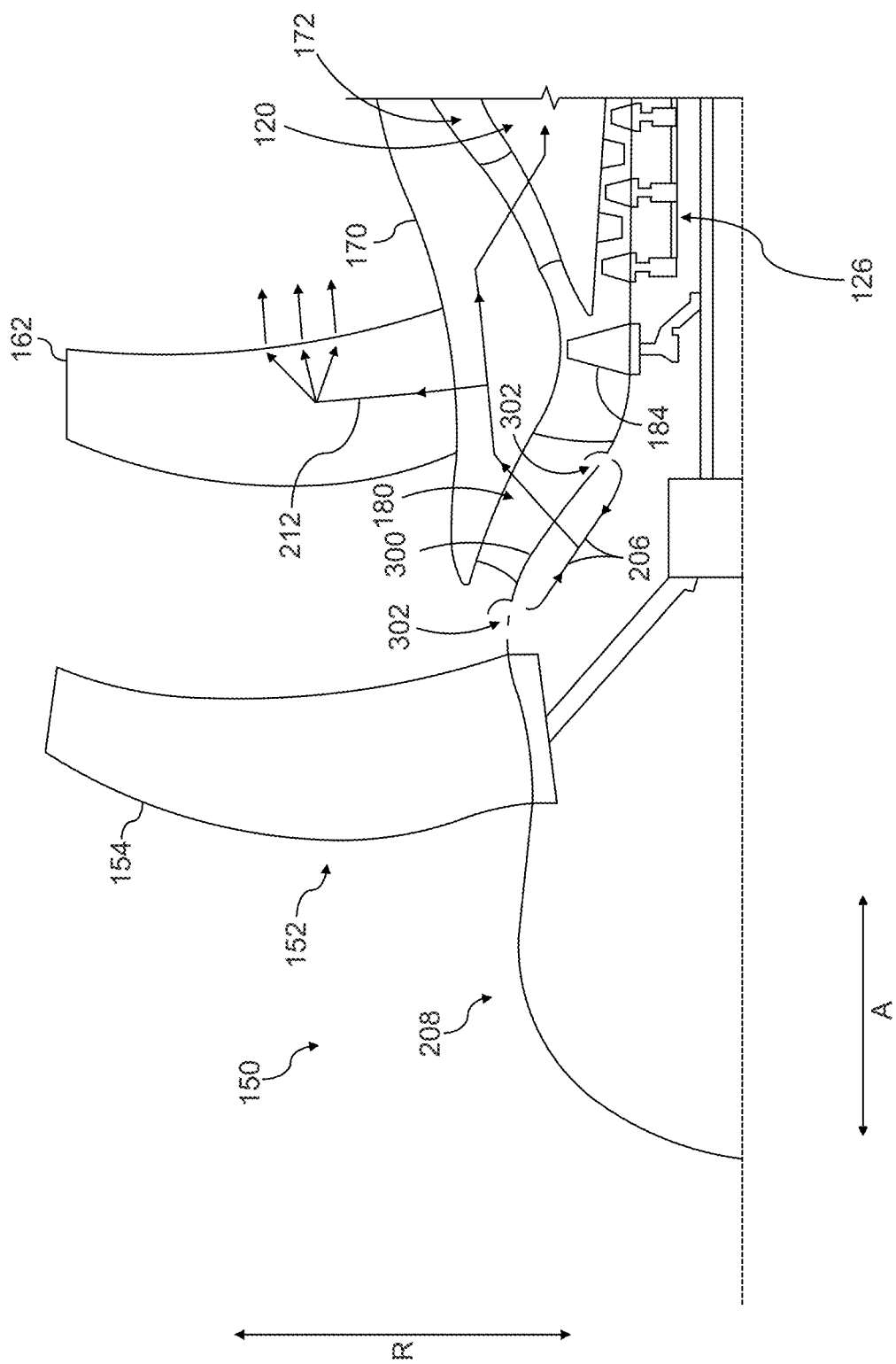
FIG. 5 is a close-up, schematic view of a gas turbine engine in accordance with yet another exemplary aspect of the present disclosure.

Referring now to FIG. 5, a close-up, schematic view is provided of an engine 100 in accordance with the present disclosure. The exemplary engine 100 of FIG. 5 may be configured in a similar manner as the exemplary engines 100 of FIGS. 1 and/or 2, and the same or similar numbers refer to the same or similar parts.

For example, the exemplary engine 100 of FIG. 5 generally includes a turbomachine 120 having a compressor section, a combustion section (see FIG. 1), and a turbine section (see FIG. 1) in serial flow order. The engine 100 further includes a fan section 150 having a fan 152 drivingly coupled to the turbomachine 120. The fan 152 is an unducted fan having a single stage of unducted rotor blades 154.

Moreover, for the embodiment depicted, the engine 100 further includes an inlet section having an inlet duct 180 located downstream of the fan 152 and upstream of the compressor section of the turbomachine 120. The inlet section includes an inner liner 300 along the radial direction R of the gas turbine engine 100, the inner liner 300 defining a boundary layer opening 302 for receiving a boundary layer airflow (i.e., a boundary layer 206 of the inlet airflow 202, e.g., through the inlet duct 180) during operation of the gas turbine engine 100.

More specifically, in the embodiment depicted, it will be appreciated that the inlet duct defines an engine inlet 182, and the boundary layer opening 302 is located downstream of the engine inlet 182.

More specifically, still, for the embodiment depicted, the boundary layer opening 302 is a first boundary layer opening 302A of a plurality of boundary layer openings 302 arranged along an axial direction A of the gas turbine engine 100.

Briefly, it will be appreciated that the exemplary engine 100 of FIG. 5 may provide the boundary layer 206 of inlet airflow 202 received through the boundary layer openings 302 to an OGV internal passage 212 and/or to a downstream location, in a similar manner as discussed above with reference to FIG. 2.

Figure 6:
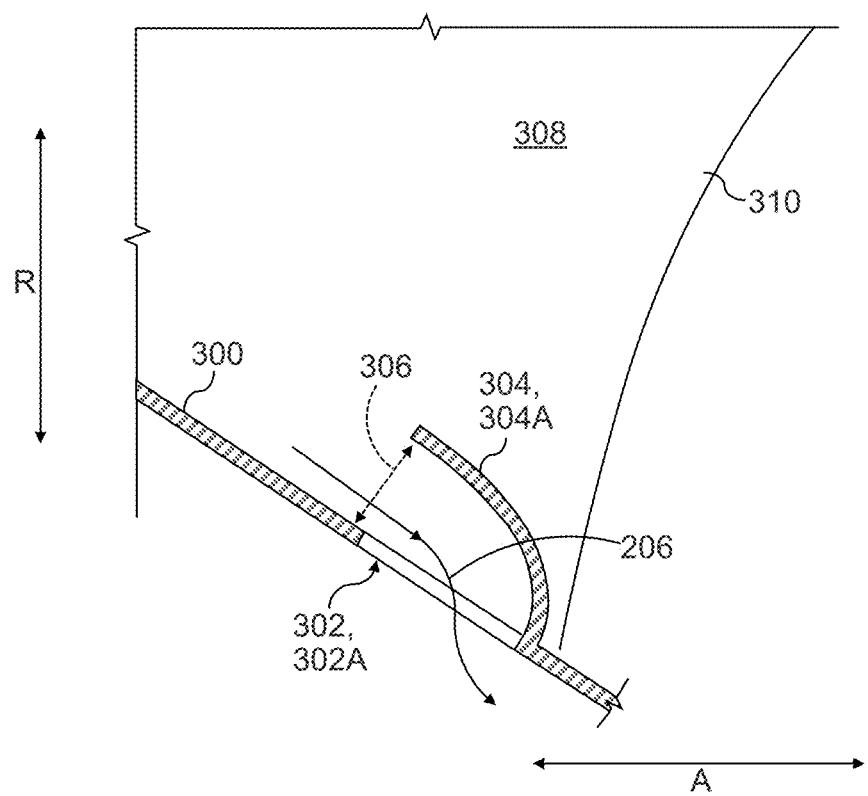
FIG. 6 is a close-up, schematic view of the first boundary layer opening of FIG. 5.

Referring now to FIG. 6, a close-up, schematic view is provided of the first boundary layer opening 302A of FIG. 5. As will be appreciated, the inlet section further includes a scoop 304, or rather a first scoop 304A, oriented in an upstream direction and associated with the first boundary layer opening 302A of the inner liner 300. The first scoop 304A may increase an amount of the boundary layer 206 ingested by the first boundary layer opening 302A.

Referring still to FIG. 6, the scoop 304 defines a height 306. The height 306 is greater than 0.25 inches and less than 3 inches. In certain exemplary embodiments, the height 306 is greater than 0.5 inches and less than 2 inches. The height 306 is defined at a leading edge of the scoop 304 and is the shortest distance to the inner liner 300.

Referring still to FIG. 6 (and as may also be seen in FIG. 5), the inlet duct 180 further includes a strut 308 extending therethrough. The first boundary layer opening 302A is aligned with the strut 308 along an axial direction A of the gas turbine engine 100. In particular, for the embodiment depicted, the first boundary layer opening 302A is positioned proximate a trailing edge 310 of the strut 308 (e.g., closer to the trailing edge 310 than to a leading edge).

Figure 7:
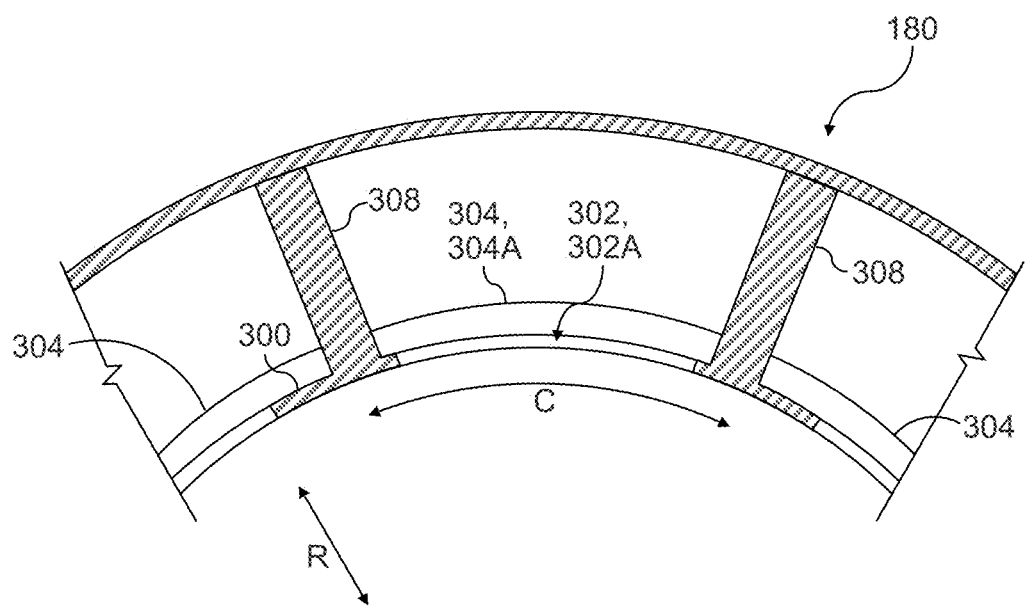
FIG. 7 is a cross-sectional view of an inlet duct at the first boundary layer opening of FIG. 6.

Referring now to FIG. 7, providing a cross-sectional view of the inlet duct 180 at the first boundary layer opening 302A, it will be appreciated that the first boundary layer opening 302A is one of a plurality of boundary layer openings 302 arranged along a circumferential direction C of the gas turbine engine 100. The first boundary layer opening 302A extends between adjacent struts 308, e.g., at least about 75% of a circumferential distance between the adjacent struts 308. Each of the plurality of boundary layer opening 302 is configured in a similar manner between adjacent respective struts 308.

Notably, the inlet section further includes a plurality of scoops 304 oriented in an upstream direction, with each scoop 304 associated with a respective boundary layer opening 302 of the plurality of boundary layer openings 302 of the inner liner 300.

It will be appreciated that for the embodiment of FIG. 7, each scoop 304 extends substantially completely between adjacent struts 308 along the circumferential direction C. For example, each scoop 304 may extend between 50% and 95% of the circumferential length between adjacent struts 308, such as between 65% and 90%.

It will be appreciated that in other exemplary embodiments, each scoop 304 may extend completely between adjacent struts 308 of the engine 100.

Figure 8:
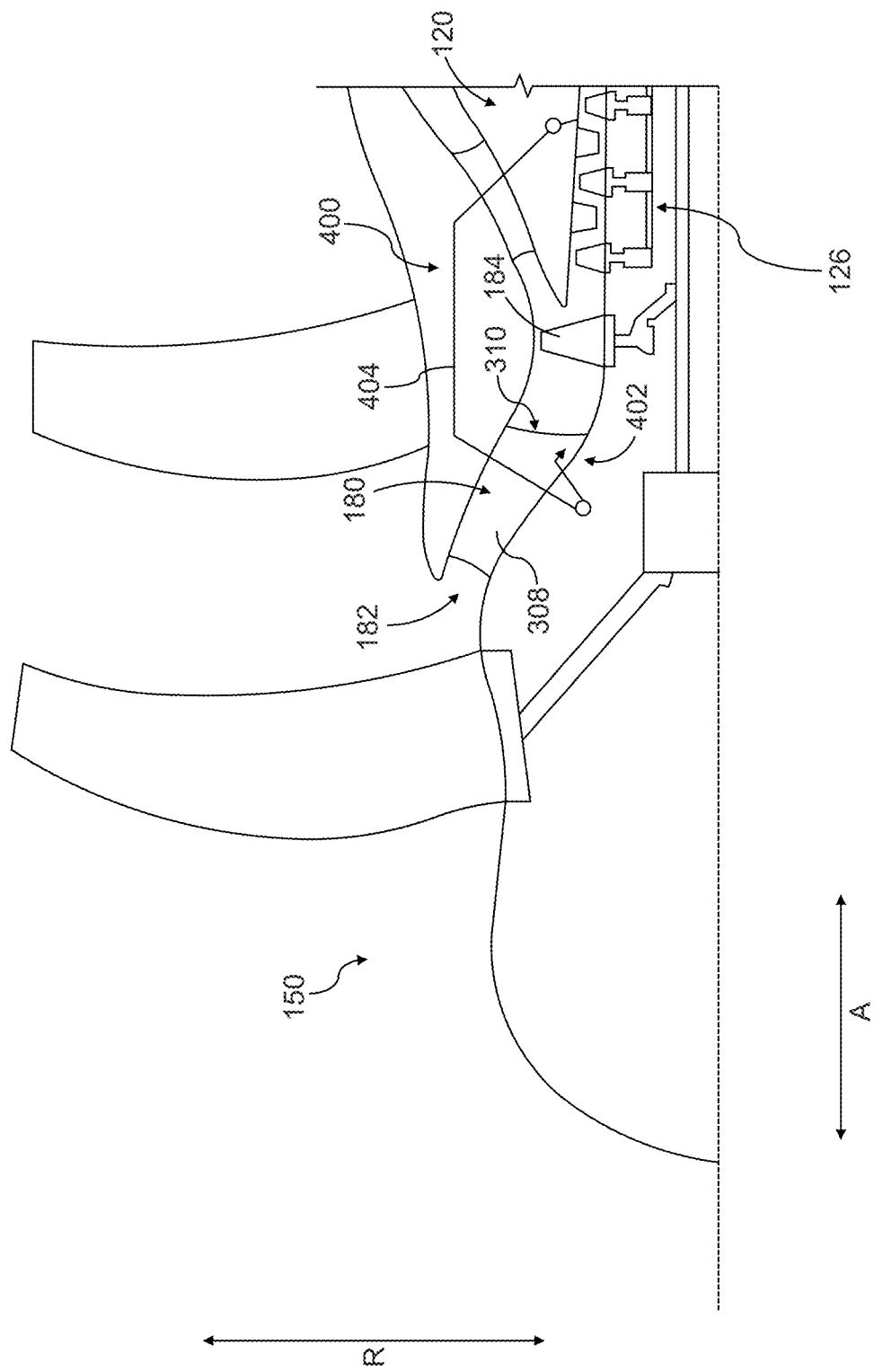
FIG. 8 is a close-up, schematic view of a gas turbine engine in accordance with still another exemplary aspect of the present disclosure.

Referring now to FIG. 8, a close-up, schematic view is provided of an engine 100 in accordance with the present disclosure. The exemplary engine 100 of FIG. 8 may be configured in a similar manner as the exemplary engines 100 of FIGS. 1, 2, and/or 5, and the same or similar numbers refer to the same or similar parts.

For example, the exemplary engine 100 of FIG. 8 generally includes a turbomachine 120 having a compressor section, a combustion section (see FIG. 1), and a turbine section (see FIG. 1) in serial flow order. The engine 100 further includes a fan section 150 having a fan 152 drivingly coupled to the turbomachine 120. The fan 152 is an unducted fan having a single stage of unducted rotor blades 154.

The engine 100 also includes an inlet section located downstream of the fan 152 and upstream of the compressor section. The inlet section includes an inlet duct 180 having an inner liner 300 along the radial direction R of the gas turbine engine 100.

Further, the engine 100 includes an airflow injection assembly 400 having an airflow injection nozzle 402 coupled to the inner liner 300 and oriented in the downstream direction. For the embodiment depicted, the airflow injection assembly 400 further includes a pressurized air distribution duct 404 in airflow communication with a pressurized airflow source and the airflow injection nozzle 402. In the embodiment depicted, the pressurized airflow source is the compressor section of the turbomachine 120, and more specifically is the low pressure compressor 126 of the compressor section of the turbomachine 120.

It will be appreciated, however, that in other exemplary embodiments, the pressurized air source may additionally or alternatively be any other suitable high pressure airflow source. For example, in other exemplary embodiments, the pressurized air source may additionally or alternatively be a high pressure compressor (e.g., high pressure compressor 128 of FIG. 1), and/or a location downstream of a ducted fan within the inlet section (e.g., ducted fan 184 of FIG. 1) and upstream of the low pressure compressor 126.

Figure 11:
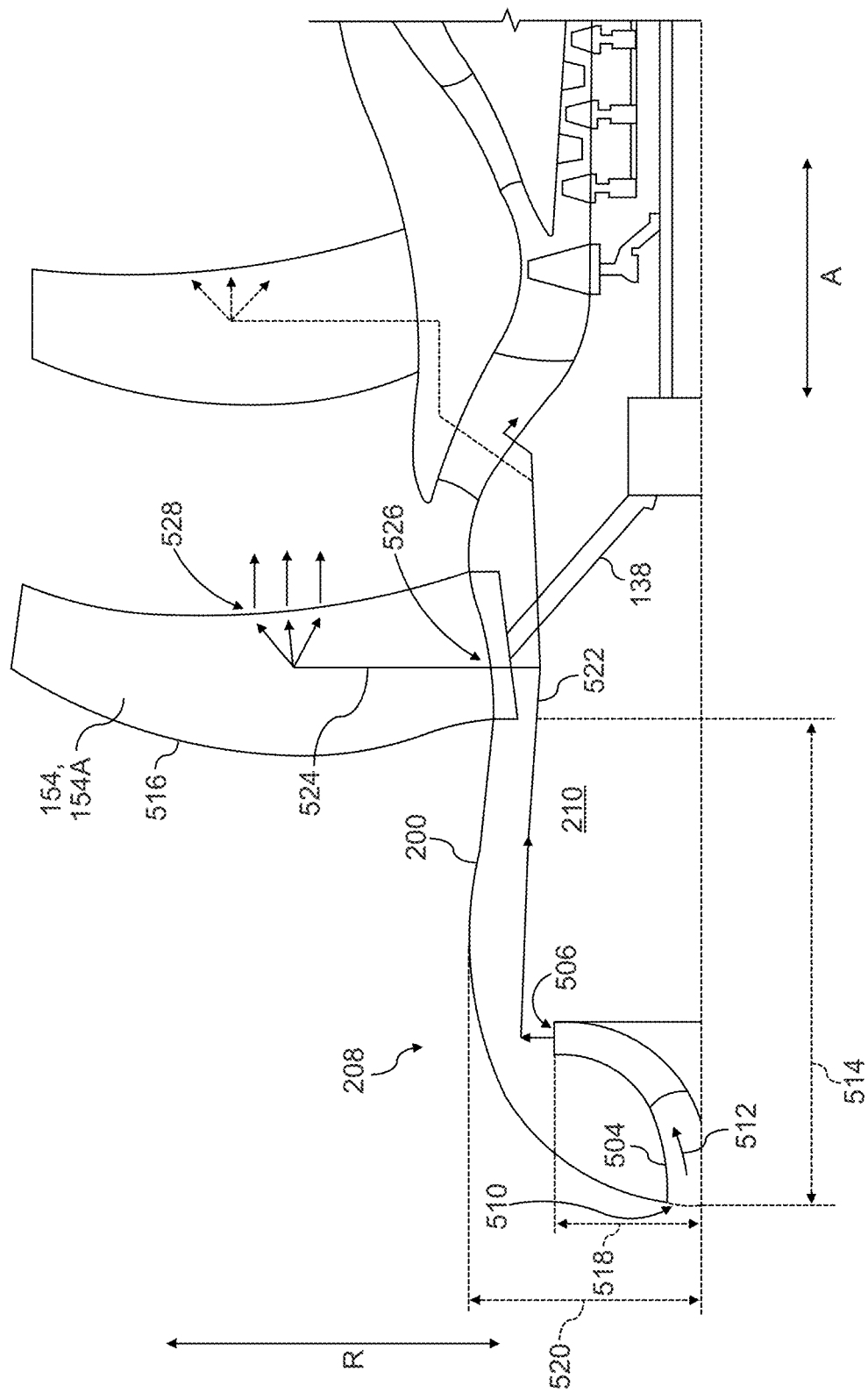
FIG. 11 is a close-up, schematic view of a gas turbine engine in accordance with yet another exemplary aspect of the present disclosure.

Further, in still other exemplary embodiments, the pressurized airflow source may additionally or alternatively be an airflow pump, such as an airflow pump located in the fan section 150 (see, e.g., FIG. 11).

Referring still to the embodiment of FIG. 8, the wherein the inlet duct 180 includes a strut 308 extending therethrough. For the embodiment depicted, the pressurized air distribution duct 404 extends through the strut 308, allowing the airflow injection assembly 400 to pull air from the pressurized airflow source at an outer location (e.g., at an outer side of the working gas flowpath through the low pressure compressor 126 for the embodiment shown).

Notably, for the embodiment of FIG. 8, the airflow injection nozzle 402 is positioned within the inlet duct 180 at a location downstream of the engine inlet 182. More specifically, for the embodiment depicted, the airflow injection nozzle 402 is aligned with the strut 308 along an axial direction A of the gas turbine engine 100, and more specifically still is positioned proximate a trailing edge 310 of the strut 308 (e.g., closer to the trailing edge 310 than a leading edge).

Figure 9:
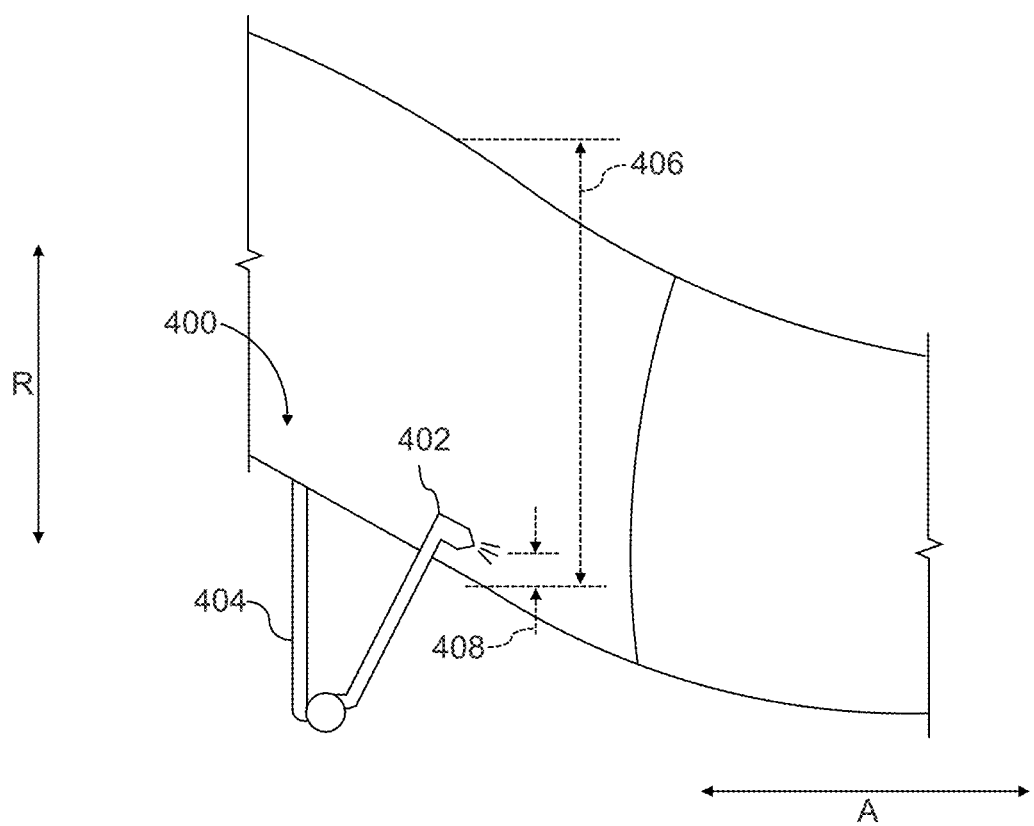
FIG. 9 is a close-up view of an airflow injection nozzle of FIG. 8.

Referring now to FIG. 9, a close-up view is provided of the airflow injection nozzle 402 of FIG. 8. As will be appreciated, the inlet duct 180 defines a flowpath height 406 along a radial direction R of the gas turbine engine 100 at a location of the airflow injection nozzle 402 along an axial direction A of the gas turbine engine 100 (i.e., a location where the airflow injection nozzle 402 injects pressurized air). Further, the airflow injection nozzle 402 defines a nozzle height 408 (i.e., a height from the inner liner 300 to where the airflow injection nozzle 402 first injects pressurized air) along the radial direction R that is less than 25% of the flowpath height 306 at the location. In particular, in at least certain exemplary embodiments, the nozzle height 408 is less than 15% of the flowpath height 406 at the location.

In such a manner, it will be appreciated that the airflow injection assembly 400 may re-energize a boundary layer of the inlet airflow through the inlet duct 180, providing a more uniform airflow to the compressor section (and ducted fan 184). The airflow injection assembly 400 may not require any actively controlled valves (providing pressurized airflow based on the pressure at the pressurized airflow source). As such, the airflow injection assembly 400 may be considered a passive system.

Figure 10:
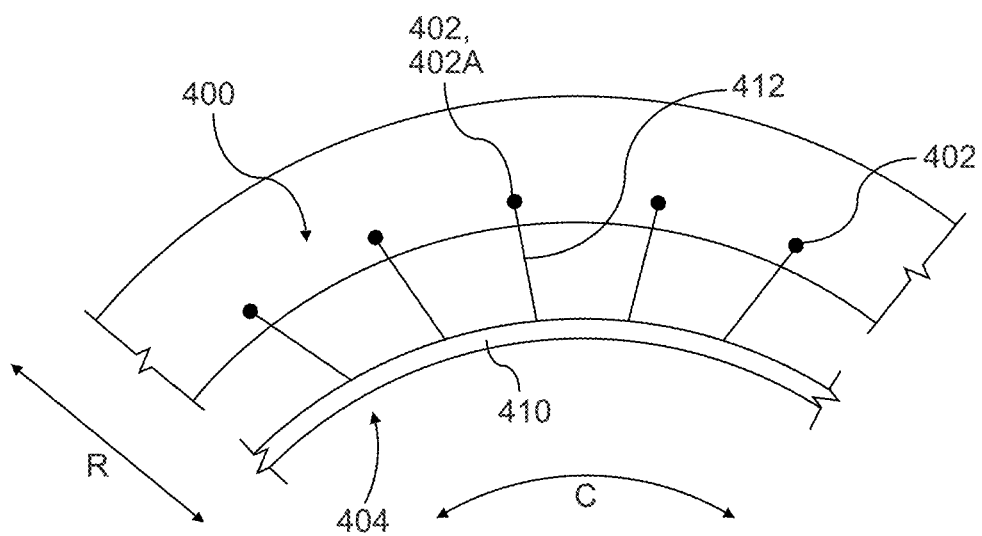
FIG. 10 is a schematic view of the airflow injection assembly of FIGS. 8 and 9.

Referring now to FIG. 10, a schematic view is provided of the airflow injection assembly 400 of FIGS. 8 and 9. As will be appreciated from the view of FIG. 10, the airflow injection nozzle 402 is a first airflow injection nozzle 402A of a plurality of airflow injection nozzles 402 spaced along a circumferential direction C of the gas turbine engine 100. In particular, the airflow injection nozzle 402 is the first airflow injection nozzle 402A of a plurality of airflow injection nozzles 402 spaced along a circumferential direction C of the gas turbine engine 100. Further, with such a configuration, the pressurized air distribution duct 404 includes a manifold 410 extending in the circumferential direction C and a plurality of extension legs 412 extending from the manifold 410, wherein each extension leg 412 is fluidly coupled to a respective airflow injection nozzle 402 of the plurality of airflow injection nozzles 402.

Moreover, it will be appreciated from the views of FIGS. 8 through 10 and the associated description that in at least certain exemplar embodiments, the engine 100 may include an icing flowpath surface, and the pressurized air distribution duct 404 may include an anti-icing section positioned in thermal communication with the icing flowpath surface. The icing flowpath surface may be one or more of a leading edge of a fan cowl 170, a leading edge 144 of the core cowl 122, an outer surface of the fan cowl 170, an inlet guide vane or strut within the inlet duct, etc. Such a configuration may allow for the pressurized air distribution duct 404 to provide additional benefit to the engine 100 with little additional cost and/or weight.

Referring now to FIG. 11, a close-up, schematic view is provided of an engine 100 in accordance with the present disclosure. The exemplary engine 100 of FIG. 11 may be configured in a similar manner as the exemplary engines 100 of FIGS. 1, 2, 5, and/or 8, and the same or similar numbers refer to the same or similar parts.

For example, the exemplary engine 100 of FIG. 11 generally includes a turbomachine 120 having a compressor section, a combustion section (see FIG. 1), and a turbine section (see FIG. 1) in serial flow order. The engine 100 further includes a fan section 150 having a fan 152 drivingly coupled to the turbomachine 120. The fan 152 is an unducted fan having a single stage of unducted rotor blades 154. The fan section 150 further includes an airflow surface 200 forming at least in part a nose cone 208 rotatable with the fan 152, the nose cone 208 defining an internal cavity 210.

However, for the embodiment depicted, the engine 100 further includes an air pump 500 positioned within the internal cavity 210, the air pump 500 having an impeller 502 rotatable with the nose cone 208 and the fan 152. The air pump 500 defines a low pressure inlet 504 upstream of the impeller 502 and a high pressure outlet 506 downstream of the impeller 502.

For the embodiment of FIG. 11, the airflow surface 200 defines one or more openings 510 configured to receive an inlet airflow 512, and wherein the low pressure inlet 504 is in fluid communication with the one or more openings 510 defined by the airflow surface 200. In such a manner, the air pump 500 may be configured to pressurize the inlet airflow 512.

In particular, for the embodiment of FIG. 11, the nose cone 208 defines a length 514 along an axial direction A of the gas turbine engine 100 between an upstream-most portion of the nose cone 208 and a leading edge 516 of a fan 152 blade of the fan 152 (i.e., a location where the leading edge 516 meets the nose cone 208). The one or more openings 510 are positioned within a forward 25% of the length 514 of the nose cone 208.

Additionally, or alternatively, the engine 100 may define one or more openings are boundary layer openings 204 (see, e.g., FIG. 2), 302 (see, e.g., FIG. 5). With such a configuration, the low pressure inlet 504 may be in fluid communication with the one or more boundary layer openings 204, 302 to pressurize the portion of the boundary layer 206 of the inlet airflow 202 received therethrough.

Referring still to FIG. 11, the impeller 502 defines an impeller height 518 along a radial direction R of the gas turbine engine 100, and the nose cone 208 defines a nose cone height 520 along the radial direction R, and wherein the impeller height 518 is equal to at least 25% of the nose cone height 520 and up to 95% of the nose cone height 520. For example, in at least certain exemplary embodiments the impeller height 518 may be equal to at least 50% of the nose cone height 520, such as at least 75% of the nose cone height

520. The greater the impeller height 518, the more potential pressure increase that may be provided by the air pump 500. However, there may be a trade-off with weight and related structural concerns.

Notably, for the embodiment depicted, the impeller 502 is coupled to the nose cone 208. Such a configuration may enable a forward-mounting location, as is shown in FIG. 11.

It will be appreciated, however, that the impeller 502, may additionally or alternatively be coupled to a shaft of the engine 100 rotatable by the turbomachine 120 (e.g., a fan shaft 138). Such a configuration may allow for the air pump to be moved aft, making it easier to receive air from, e.g., one or more openings are boundary layer openings 204 (see, e.g., FIG. 2), 302 (see, e.g., FIG. 5).

The engine 100 includes a pressurized air duct 522 in fluid communication with the high pressure outlet 506. The pressurized air duct 522 may provide pressurized air to an airflow injection assembly 400, as is discussed in detail above, to an OGV internal passage 212 of an outlet guide vane, or to any other suitable pressurized air sink. The pressurized air duct 522 may be stationary along a circumferential direction C relative to the impeller 502.

Notably, for the embodiment of FIG. 11, the fan 152 includes a plurality of rotor blades 154. A first rotor blade 154A of the plurality of rotor blades 154 defines a fan blade cavity 524 extending at least partially along a span of the first rotor blade 154A, an inlet 526 to the fan blade cavity 524, and an outlet 528 of the fan blade cavity 524. The inlet 526 to the fan blade cavity 524 is in fluid communication with the high pressure outlet 506 of the air pump 500 through the pressurized air duct 522. Although not depicted, the inlet 526 may have any suitable stationary to rotating airflow transfer assembly.

For the embodiment depicted, the outlet 528 is located along a radial direction R of the engine 100 between a 25% span of the first rotor blade 154A (i.e., at a radial location within an inner 25% of a total span of the first rotor blade 154A) and a 90% span of the first rotor blade. Moreover, for the embodiment depicted, the outlet 528 of the fan blade cavity 524 is a first outlet 528 of a plurality of outlets 528 spaced along the span of the first rotor blade.

It will be appreciated that although the above features are described in the context of the first rotor blade 154A, each of the plurality of rotor blades 154 may include a similar configuration.

Inclusion of such a configuration may allow for the engine 100 to utilize airflow that was previously an efficiency burden on the engine 100. In particular, utilizing air pressurized by the air pump 500 in such a manner may allow for the airflow to be used to reduce separation of a flow across the fan blades 154, and may further allow for the airflow to contribute to, e.g., thrust generation for the engine 100.

It will be appreciated that the exemplary configuration of FIG. 11 includes two means for increasing a pressure of a low pressure air, i.e., the air pump 500 and the fan blade cavity 524 extending at least partially along the span of the first rotor blade 154A (or rather fan blade cavities 524 extending at least partially along the span of each of the respective rotor blades 154). Although both means are depicted in the embodiment of FIG. 11, in other exemplary embodiments the engine 100 may only include one of the two means for increasing the pressure.

Figure 12:
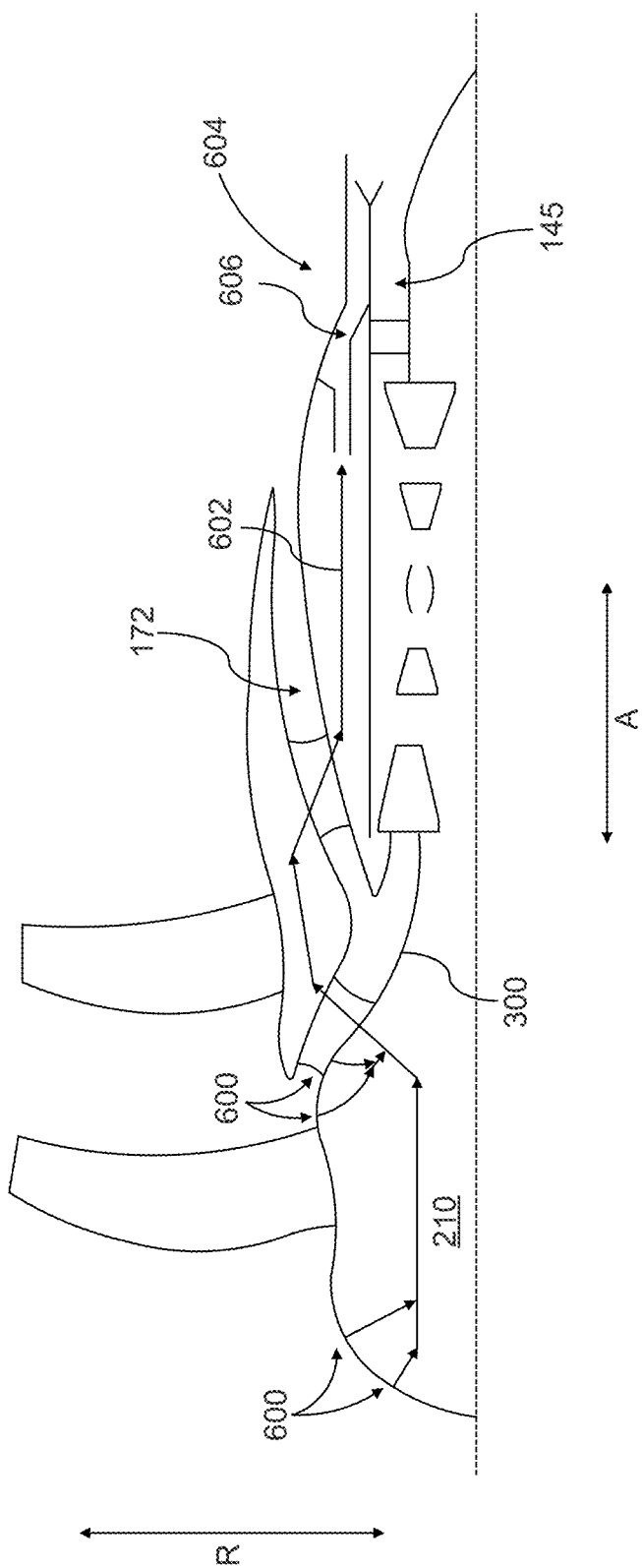
FIG. 12 is a close-up, schematic view of a gas turbine engine in accordance with still another exemplary aspect of the present disclosure

For example, in certain exemplary embodiments, the engine 100 may include the air pump 500 operable to increase a pressure of an airflow through one or more boundary layer openings (see FIGS. 2 through 7) to facilitate better extraction of the airflow through an outlet guide vane(s), through the embodiment of FIGS. 12 thorough 14, etc. Additionally, or alternatively, the airflow having the increased pressure may be used to ventilate various compartments of the engine.

Alternatively, in other exemplary embodiments, the engine 100 may include the fan blade cavities 524 extending at least partially along the span of each of the respective rotor blades 154 operable to receive an airflow from one or more boundary layer openings (see FIGS. 2 through 7) and provide such airflow out through the trailing edge of the rotor blades 154 for the purposes described above.

Referring now to FIG. 12, a close-up, schematic view is provided of an engine 100 in accordance with the present disclosure. The exemplary engine 100 of FIG. 12 may be configured in a similar manner as the exemplary engines 100 of FIGS. 1, 2, 5, 8, and/or 11, and the same or similar numbers refer to the same or similar parts.

For example, the exemplary engine 100 of FIG. 12 generally includes a turbomachine 120 having a compressor section, a combustion section (see FIG. 1), a turbine section (see FIG. 1), and an exhaust 145 (which may include an exhaust nozzle 140 as in FIG. 1) in serial flow order. The engine 100 further includes a fan section 150 having a fan 152 drivingly coupled to the turbomachine 120. The fan 152 is an unducted fan having a single stage of unducted rotor blades 154. The fan section 150 further includes an airflow surface 200 forming at least in part a nose cone 208 rotatable with the fan 152, and the engine 100 further includes an inlet section having an inlet duct 180. Moreover, as with the embodiment of FIG. 1, the engine 100 of FIG. 12 include a fan duct 172, sometimes also referred to as a third stream.

For the embodiment of FIG. 12, the engine includes a plurality of boundary layer openings 600 and a low pressure duct 602 in airflow communication with the plurality of boundary layer openings 600. The boundary layer openings 600 may be configured in a similar manner as the boundary layer openings 204 (see, e.g., FIG. 2), and/or the boundary layer openings 302 (see, e.g., FIG. 5).

In such a manner, it will be appreciated that the low pressure duct 602 is in fluid communication with a low pressure airflow source, and that for the embodiment depicted, the low pressure airflow source may be an internal cavity 210 of a nose cone 208 of the fan section 150 of the gas turbine engine 100. For example, in the embodiment depicted, the nose cone 208 defies one or more of the plurality of boundary layer openings 600 in airflow communication with the internal cavity 210 of the nose cone 208. Additionally, for the embodiment depicted, the low pressure airflow source is a boundary layer opening 600 defined in an inner liner 300 of an inlet duct 180 of the gas turbine engine 100.

Although not depicted, the low pressure airflow source may be the fan duct 172, or third stream, of the gas turbine engine 100. For example, the low pressure duct 602 may be configured to receive an airflow from the fan duct 172 at a location proximate an outlet of the fan duct 172, downstream of a heat exchanger, or both. Such a configuration may reduce a back pressure on, e.g., the ducted fan 184, improving operability.

Referring still to FIG. 12, the engine 100 further includes an airflow mixer assembly 604. The airflow mixer assembly 604 includes the low pressure duct 602, at least a portion of which positioned within a core cowl 122 enclosing at least in part the turbomachine 120, and a plenum 606 extending along the circumferential direction C located downstream of the low pressure duct 602 and in fluid communication with the low pressure duct 602. The plenum 606 may be formed in part by a structure of the core cowl 122 and other aspects of the turbomachine 120.

In at least certain exemplary embodiments, the low pressure duct 602 may be a first low pressure duct 602 of a plurality of low pressure ducts 602 positioned within the core cowl 122 and in fluid communication with the plenum 606. The plurality of low pressure ducts 602 may be spaced along the circumferential direction C. Further, the plenum 606 may be an annular plenum 606 extending substantially 360 degrees in the circumferential direction C (e.g., extending continuously along the circumferential direction, with the exception of any structural supports or the like, such as at least 300 degrees cumulatively in the circumferential direction C). In such a manner, the plurality of low pressure ducts 602 may distribute low pressure air to the plenum more evenly along the circumferential direction C.

Figure 13:
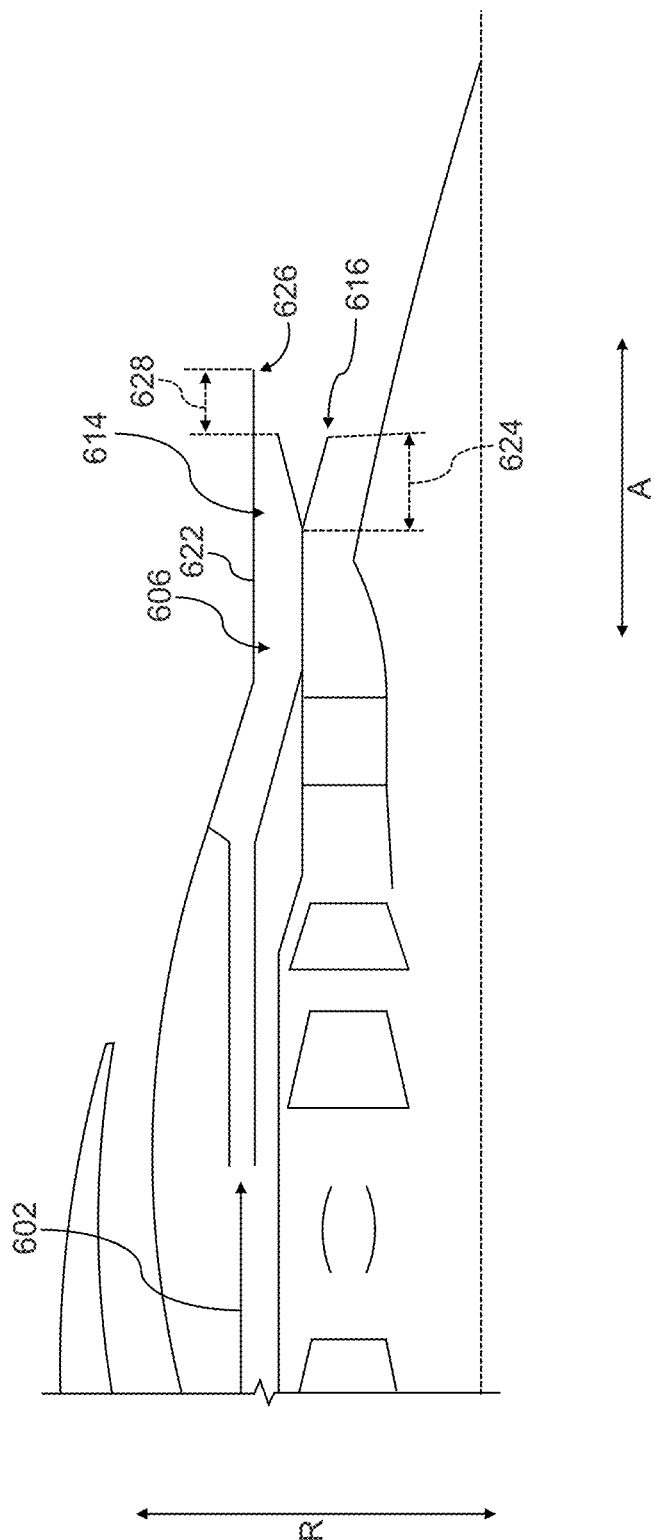
FIG. 13 is a close-up view of an airflow mixer assembly of FIG. 12.

Referring now to FIG. 13, a close-up view of the airflow mixer assembly 604 of FIG. 12 is provided. The airflow mixer assembly 604 additionally includes a mixer 614 located downstream of the plenum 606 and downstream of the exhaust 145 and in fluid communication with both the plenum 606 and the exhaust 145 for mixing a low pressure airflow from the low pressure duct 602 with an exhaust gas flow (e.g., combustion gasses) from the exhaust 145.

Figure 14:
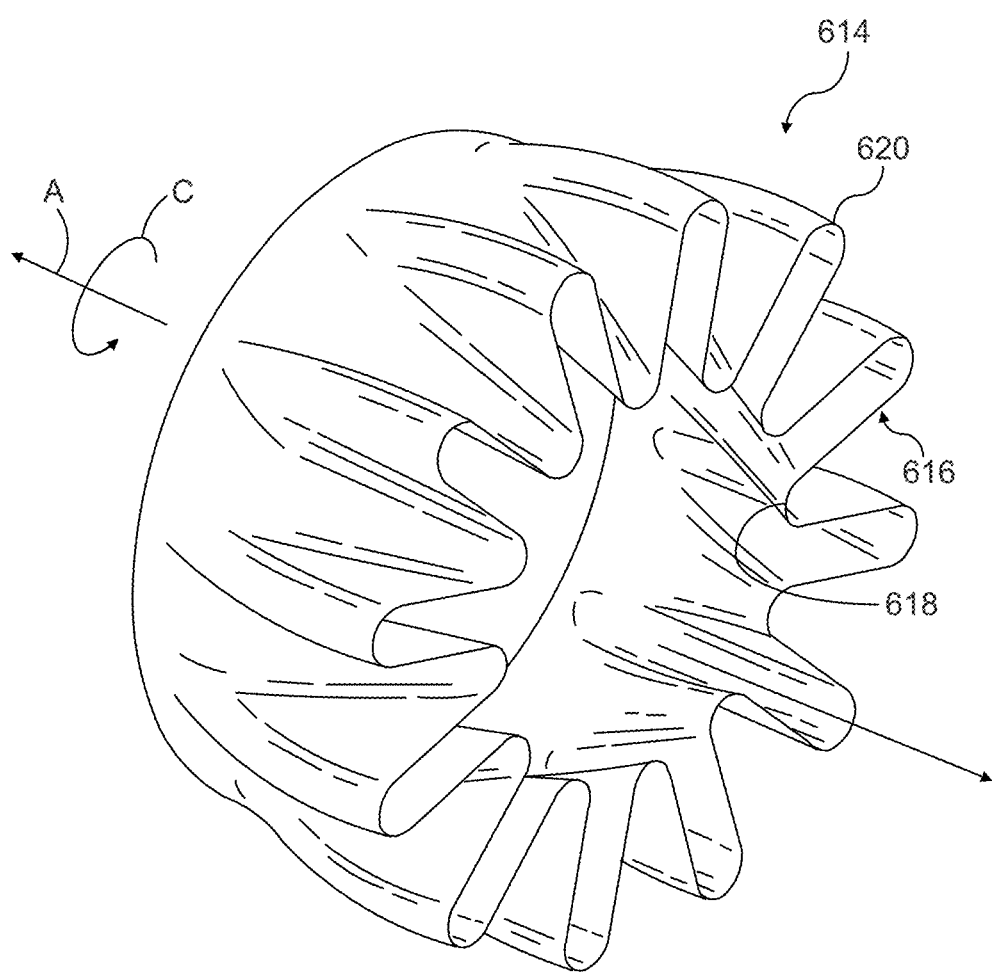
FIG. 14 is a perspective view of a mixer of FIG. 13.

Referring now briefly to FIG. 14, providing a perspective view of the mixer 614 of FIG. 13, it will be appreciated that the mixer 614 is an annular mixer having a downstream end 616 defining a substantially sinusoidal pattern forming inner lobes 618 and outer lobes 620 arranged sequentially along a circumference of the downstream end 616. In such a manner, the mixer 614 may be referred to as a daisy mixer.

Referring back to FIG. 13, it will be appreciated that the airflow mixer assembly 604 further includes an outer shroud 622 located outward of the plenum 606 along the radial direction R and extending along the circumferential direction C and along the axial direction A over and downstream of the mixer 614. In such a manner, the shroud 622 completely encloses the mixer 614.

More specifically, the mixer 614 defines a length 624 along the axial direction A of the gas turbine engine 100, and the outer shroud 622 defines a downstream portion 626 extending past the mixer 614 along the axial direction A. The downstream portion 626 defines a length 628 along the axial direction A equal to at least 25% and up to 500% of the length 624 of the mixer 614. In particular, in at least certain exemplary embodiments, the length 628 of the downstream portion 626 is equal to at least 50% of the length 624 of the mixer 614, such as at least 75% of the length 624 of the mixer 614.

As will be appreciated, the airflow mixer assembly 604 may therefore "pull" low pressure air from and through the low pressure ducts 602 using, e.g., the venturi effect to urge the low pressure air through the low pressure ducts 602 using the relatively high pressure combustion gasses through the exhaust 145.

Further aspects are provided by the subject matter of the following clauses:

A gas turbine engine comprising: a turbomachine having a compressor section, a combustion section, and a turbine section in serial flow order; and a fan section having a fan drivingly coupled to the turbomachine and an airflow surface rotatable with the fan and exposed to a fan airflow provided to and through the fan during operation of the gas turbine engine, the airflow surface defining a plurality of boundary layer openings configured to ingest a boundary layer of the fan airflow over the airflow surface during operation of the gas turbine engine.

The gas turbine engine of one or more of these clauses, wherein the gas turbine engine defines an axial direction, and wherein the plurality of boundary layer openings are spaced along the axial direction.

The gas turbine engine of one or more of these clauses, wherein the plurality of boundary layer openings includes one or more boundary layer openings located forward of the fan.

The gas turbine engine of one or more of these clauses, wherein the plurality of boundary layer openings includes one or more boundary layer openings located aft of the fan.

The gas turbine engine of one or more of these clauses, wherein the plurality of boundary layer openings includes one or more boundary layer openings located forward of the fan and one or more boundary layer openings located aft of the fan.

The gas turbine engine of one or more of these clauses, wherein the fan section further comprises a plurality of diffusers, wherein each diffuser is associated with a respective one of the plurality of boundary layer openings.

The gas turbine engine of one or more of these clauses, wherein the plurality of boundary layer openings includes a first boundary layer opening, wherein the plurality of diffusers includes a first diffuser associated with the first boundary layer opening, wherein the first diffuser includes an inlet located at the first boundary layer opening and an outlet, wherein an area ratio between the outlet and the inlet is greater than 1:1 and up to 6:1.

The gas turbine engine of one or more of these clauses, wherein the area ratio is between 2:1 and 4:1.

The gas turbine engine of one or more of these clauses, wherein the plurality of boundary layer openings includes a first boundary layer opening, wherein the plurality of diffusers includes a first diffuser associated with the first boundary layer opening, wherein the first diffuser includes an inlet located at the first boundary layer opening and an outlet, wherein the first diffuser defines a mean airflow direction from the inlet to the outlet, and wherein the mean airflow direction defines an angle with a reference plane defined by a radial direction and a circumferential direction greater than 0 degrees and less than 60 degrees.

The gas turbine engine of one or more of these clauses, wherein the angle is between 10 degrees and 50 degrees.

The gas turbine engine of one or more of these clauses, wherein the plurality of boundary layer openings includes a first boundary layer opening, wherein the plurality of diffusers includes a first diffuser associated with the first boundary layer opening, wherein the first diffuser includes an inlet located at the first boundary layer opening and an outlet, wherein the first diffuser defines a mean airflow direction from the inlet to the outlet, and wherein the mean airflow direction defines an angle with a reference plane defined by a radial direction and an axial direction greater than 0 degrees and less than 60 degrees.

The gas turbine engine of one or more of these clauses, wherein the angle is between 10 degrees and 50 degrees.

The gas turbine engine of one or more of these clauses, wherein the fan is an unducted fan having a single stage of unducted rotor blades.

The gas turbine engine of one or more of these clauses, wherein the airflow surface forms at least in part a nose cone for the gas turbine engine, and wherein the nose cone defines an internal cavity, and wherein the plurality of boundary layer openings are in airflow communication with the internal cavity.

The gas turbine engine of one or more of these clauses, further comprising: a plurality of stationary outlet guide vanes located downstream of the fan, wherein each stationary outlet guide vane of the plurality of stationary outlet guide vanes defines an OGV internal passage, wherein the internal cavity of the nose cone is in fluid communication with the OGV internal passages of the plurality of outlet guide vanes.

The gas turbine engine of one or more of these clauses, wherein each stationary outlet guide vane of the plurality of stationary outlet guide vanes defines an outlet at a trailing edge fluidly coupled to the respective OGV internal passage.

The gas turbine engine of one or more of these clauses, wherein the turbomachine comprises a core cowl and defines an under-cowl duct fluidly coupled to the internal cavity of the nose cone, and wherein the turbomachine comprises a mixer assembly fluidly coupled to the under-cowl duct and an exhaust of the turbomachine for mixing an airflow from the under-cowl duct with an exhaust airflow from the exhaust of the turbomachine.

A gas turbine engine defining a radial direction, the gas turbine engine comprising: a turbomachine having a compressor section, a combustion section, and a turbine section in serial flow order; a fan section comprising a fan drivingly coupled to the turbomachine; and an inlet section located downstream of the fan and upstream of the compressor section, the inlet section comprising an inner liner along the radial direction of the gas turbine engine, the inner liner defining a boundary layer opening for receiving a boundary layer airflow during operation of the gas turbine engine.

The gas turbine engine of one or more of these clauses, wherein the inlet section comprises an inlet duct, wherein the inlet duct includes the inner liner, wherein the inlet duct defines an engine inlet, and wherein the boundary layer opening is located downstream of the engine inlet.

The gas turbine engine of one or more of these clauses, wherein the inlet section further comprising a scoop oriented in an upstream direction and associated with the boundary layer opening of the inner liner.

The gas turbine engine of one or more of these clauses, wherein the scoop defines a height, wherein the height is greater than 0.25 inches and less than 3 inches.

The gas turbine engine of one or more of these clauses, wherein the height is greater than 0.5 inches and less than 2 inches.

The gas turbine engine of one or more of these clauses, wherein the inlet duct comprises a strut extending therethrough, and wherein the boundary layer opening is aligned with the strut along an axial direction of the gas turbine engine.

The gas turbine engine of one or more of these clauses, wherein the boundary layer opening is positioned proximate a trailing edge of the strut.

The gas turbine engine of one or more of these clauses, wherein the boundary layer opening is a first boundary layer opening of a plurality of boundary layer openings arranged along a circumferential direction of the gas turbine engine.

The gas turbine engine of one or more of these clauses, wherein the inlet section further comprises a plurality of scoops oriented in an upstream direction, wherein each scoop is associated with a respective boundary layer opening of the plurality of boundary layer openings of the inner liner.

The gas turbine engine of one or more of these clauses, wherein the boundary layer opening is a first boundary layer opening of a plurality of boundary layer openings arranged along an axial direction of the gas turbine engine.

The gas turbine engine of one or more of these clauses, further comprising: a plurality of stationary outlet guide vanes located downstream of the fan, wherein each stationary outlet guide vane of the plurality of stationary outlet guide vanes defines an OGV internal passage, wherein the boundary layer opening of the inner liner is in fluid communication with the OGV internal passages of the plurality of outlet guide vanes.

The gas turbine engine of one or more of these clauses, wherein each stationary outlet guide vane of the plurality of stationary outlet guide vanes defines an outlet at a trailing edge fluidly coupled to the respective OGV internal passage.

The gas turbine engine of one or more of these clauses, wherein the turbomachine comprises a core cowl and defines an under-cowl duct fluidly coupled to the boundary layer opening, and wherein the turbomachine comprises a mixer assembly fluidly coupled to the under-cowl duct and an exhaust of the turbomachine for mixing an airflow from the under-cowl duct with an exhaust airflow from the exhaust of the turbomachine.

A gas turbine engine defining a radial direction, the gas turbine engine comprising: a turbomachine having a compressor section, a combustion section, and a turbine section in serial flow order; a fan section comprising a fan drivingly coupled to the turbomachine; an inlet section located downstream of the fan and upstream of the compressor section, the inlet section comprising an inner liner along the radial direction of the gas turbine engine; and an airflow injection assembly comprising an airflow injection nozzle coupled to the inner liner and oriented in the downstream direction.

The gas turbine engine of one or more of these clauses, wherein the airflow injection assembly further comprises a pressurized air distribution duct in airflow communication with a pressurized airflow source and the airflow injection nozzle.

The gas turbine engine of one or more of these clauses, wherein the pressurized airflow source is the compressor section of the turbomachine.

The gas turbine engine of one or more of these clauses, wherein the pressurized airflow source is a low pressure compressor of the compressor section of the turbomachine.

The gas turbine engine of one or more of these clauses, wherein the pressurized airflow source is an airflow pump located in the fan section.

The gas turbine engine of one or more of these clauses, wherein the airflow injection nozzle is a first airflow injection nozzle of a plurality of airflow injection nozzles spaced along a circumferential direction of the gas turbine engine.

The gas turbine engine of one or more of these clauses, wherein the inlet section comprises an inlet duct, wherein the inlet duct includes the inner liner, wherein the inlet duct defines an engine inlet, and wherein the airflow injection nozzle is located downstream of the engine inlet.

The gas turbine engine of one or more of these clauses, wherein the inlet duct comprises a strut extending therethrough, and wherein the airflow injection nozzle is aligned with the strut along an axial direction of the gas turbine engine.

The gas turbine engine of one or more of these clauses, wherein the airflow injection assembly further comprises a pressurized air distribution duct in airflow communication with a pressurized airflow source and the airflow injection nozzle, wherein the inlet duct comprises a strut extending therethrough, and wherein pressurized air distribution duct extends through the strut.

The gas turbine engine of one or more of these clauses, wherein the airflow injection nozzle is positioned proximate a trailing edge of the strut.

The gas turbine engine of one or more of these clauses, wherein the airflow injection nozzle is a first airflow injection nozzle of a plurality of airflow injection nozzles spaced along a circumferential direction of the gas turbine engine, wherein the pressurized air distribution duct comprises a manifold extending in the circumferential direction and a plurality of extension legs extending from the manifold, wherein each extension leg is fluidly coupled to a respective airflow injection nozzle of the plurality of airflow injection nozzles.

The gas turbine engine of one or more of these clauses, wherein the inlet section comprises an inlet duct, wherein the inlet duct defines a flowpath height along a radial direction of the gas turbine engine at a location of the airflow injection nozzle along an axial direction of the gas turbine engine, and wherein the airflow injection nozzle defines a nozzle height from the inner liner less than 25% of the flowpath height at the location.

The gas turbine engine of one or more of these clauses, wherein the nozzle height is less than 15% of the flowpath height at the location.

The gas turbine engine of one or more of these clauses, wherein the airflow injection assembly is a passive system.

The gas turbine engine of one or more of these clauses, wherein the gas turbine engine comprises an icing flowpath surface, and wherein the pressurized air distribution duct comprises an anti-icing section positioned in thermal communication with the icing flowpath surface.

A gas turbine engine comprising: a turbomachine having a compressor section, a combustion section, and a turbine section in serial flow order; and a fan section having a fan drivingly coupled to the turbomachine, the fan section comprising an airflow surface forming at least in part a nose cone rotatable with the fan, the nose cone defining an internal cavity; and an air pump positioned within the internal cavity, the air pump comprising an impeller rotatable with the nose cone and the fan, the air pump defining a low pressure inlet upstream of the impeller and a high pressure outlet downstream of the impeller.

The gas turbine engine of one or more of these clauses, wherein the airflow surface defines one or more openings configured to receive an inlet airflow, and wherein the low pressure inlet is in fluid communication with the one or more openings defined by the airflow surface.

The gas turbine engine of one or more of these clauses, wherein the nose cone defines a length along an axial direction of the gas turbine engine between an upstreammost portion and a leading edge of a fan blade of the fan, and wherein the one or more openings are positioned within a forward 25% of the length of the nose cone.

The gas turbine engine of one or more of these clauses, wherein the one or more openings are boundary layer openings.

The gas turbine engine of one or more of these clauses, wherein the impeller defines an impeller height along a radial direction of the gas turbine engine, wherein the nose cone defines a nose cone height along the radial direction, and wherein the impeller height is equal to at least 25% of the impeller height and up to 95% of the impeller height.

The gas turbine engine of one or more of these clauses, wherein the impeller height is equal to at least 50% of the impeller height.

The gas turbine engine of one or more of these clauses, wherein the impeller height is equal to at least 75% of the impeller height.

The gas turbine engine of one or more of these clauses, wherein the impeller is coupled to the nose cone.

The gas turbine engine of one or more of these clauses, wherein the impeller is coupled to a shaft of the gas turbine engine rotatable by the turbomachine.

The gas turbine engine of one or more of these clauses, wherein the fan comprises a plurality of rotor blades, wherein a first rotor blade of the plurality of rotor blades defines a fan blade cavity extending at least partially along a span of the first rotor blade, an inlet to the fan blade cavity, and an outlet of the fan blade cavity, wherein the inlet to the fan blade cavity is in fluid communication with the high pressure outlet of the air pump.

The gas turbine engine of one or more of these clauses, wherein the outlet is located along a radial direction of the gas turbine engine between a 25% span of the first rotor blade and a 90% span of the first rotor blade.

The gas turbine engine of one or more of these clauses, wherein the outlet of the fan blade cavity is a first outlet of a plurality of outlets spaced along the span of the first rotor blade.

The gas turbine engine of one or more of these clauses, further comprising: an inlet section located downstream of the fan and upstream of the compressor section, the inlet section comprising an inner liner along the radial direction of the gas turbine engine; and an airflow injection assembly comprising an airflow injection nozzle coupled to the inner liner and oriented in the downstream direction, the airflow injection nozzle in fluid communication with the high pressure outlet of the air pump.

A gas turbine engine defining a radial direction, an axial direction, and a circumferential direction, the gas turbine engine comprising: a fan section comprising a fan drivingly coupled to the turbomachine; a turbomachine having a compressor section, a combustion section, a turbine section, and an exhaust in serial flow order, the turbomachine further comprising a core cowl enclosing at least in part the turbine section and the exhaust; and an airflow mixer assembly comprising: a low pressure duct positioned within the core cowl; a plenum extending along the circumferential direction located downstream of the low pressure duct and in fluid communication with the low pressure duct; a mixer located downstream of the plenum and downstream of the exhaust and in fluid communication with both the plenum and the exhaust for mixing a low pressure airflow from the low pressure duct with an exhaust gas flow from the exhaust; and an outer shroud located outward of the plenum along the radial direction and extending along the circumferential direction and along the axial direction over and downstream of the mixer.

The gas turbine engine of one or more of these clauses, wherein the mixer is an annular mixer having a downstream end defining a substantially sinusoidal pattern forming inner lobes and outer lobes arranged sequentially along a circumference of the downstream end.

The gas turbine engine of one or more of these clauses, wherein the low pressure duct is a first low pressure duct of a plurality of low pressure ducts positioned within the core cowl and in fluid communication with the plenum.

The gas turbine engine of one or more of these clauses, wherein the plenum is an annular plenum extending substantially 360 degrees in the circumferential direction.

The gas turbine engine of one or more of these clauses, wherein the low pressure duct is in fluid communication with a low pressure airflow source.

The gas turbine engine of one or more of these clauses, wherein the low pressure airflow source is an internal cavity of a nose cone of the fan section of the gas turbine engine.

The gas turbine engine of one or more of these clauses, wherein the nose cone defines a plurality of boundary layer openings in airflow communication with the internal cavity of the nose cone.

The gas turbine engine of one or more of these clauses, wherein the low pressure airflow source is a boundary layer opening defined in an inner liner of an inlet duct of the gas turbine engine.

The gas turbine engine of one or more of these clauses, wherein the low pressure airflow source is a third stream of the gas turbine engine.

The gas turbine engine of one or more of these clauses, wherein the mixer defines a length along the axial direction of the gas turbine engine, and wherein the outer shroud defines a downstream portion extending past the mixer along the axial direction, wherein the downstream portion defines a length along the axial direction equal to at least 25% and up to 500% of the length of the mixer.

The gas turbine engine of one or more of these clauses, wherein the length of the downstream portion is equal to at least 50% of the length of the mixer.

The gas turbine engine of one or more of these clauses, wherein the length of the downstream portion is equal to at least 75% of the length of the mixer.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:
  a turbomachine having a compressor section, a combustion section, and a turbine section in serial flow order; and
  a fan section having a fan drivingly coupled to the turbomachine and an airflow surface rotatable with the fan and exposed to a fan airflow provided to and through the fan during operation of the gas turbine engine, the airflow surface defining a plurality of boundary layer openings configured to ingest a boundary layer of the fan airflow over the airflow surface during operation of the gas turbine engine;
  wherein the fan section further comprises a plurality of diffusers, each diffuser is associated with a respective one of the plurality of boundary layer openings; and
  wherein each diffuser comprises an inlet, an outlet, and a mean airflow direction from the inlet to the outlet, wherein the mean airflow direction defines an angle with a reference plane defined by a radial direction and a circumferential direction greater than 0 degrees and less than 60 degrees.

2. The gas turbine engine of claim 1, wherein the gas turbine engine defines an axial direction, and wherein the plurality of boundary layer openings are spaced along the axial direction.

3. The gas turbine engine of claim 1, wherein the plurality of boundary layer openings includes one or more boundary layer openings located forward of the fan.

4. The gas turbine engine of claim 1, wherein the plurality of boundary layer openings includes one or more boundary layer openings located aft of the fan.

5. The gas turbine engine of claim 1, wherein the plurality of boundary layer openings includes one or more boundary layer openings located forward of the fan and one or more boundary layer openings located aft of the fan.

6. The gas turbine engine of claim 1, wherein the plurality of boundary layer openings includes a first boundary layer opening, wherein the plurality of diffusers includes a first diffuser associated with the first boundary layer opening,
  wherein the first diffuser includes an inlet located at the first boundary layer opening and an outlet, wherein an area ratio between the outlet and the inlet is greater than 1:1 and up to 6:1.

7. The gas turbine engine of claim 6, wherein the area ratio is between 2:1 and 4:1.

8. The gas turbine engine of claim 1, wherein the angle is between 10 degrees and 50 degrees.

9. The gas turbine engine of claim 1, wherein the fan is an unducted fan having a single stage of unducted rotor blades.

10. The gas turbine engine of claim 1, wherein the airflow surface forms at least in part a nose cone for the gas turbine engine, and wherein the nose cone defines an internal cavity, and wherein the plurality of boundary layer openings are in airflow communication with the internal cavity.

11. The gas turbine engine of claim 10, further comprising:
  a plurality of stationary outlet guide vanes located downstream of the fan, wherein each stationary outlet guide vane of the plurality of stationary outlet guide vanes defines an OGV internal passage, wherein the internal cavity of the nose cone is in fluid communication with the OGV internal passages of the plurality of stationary outlet guide vanes.

12. The gas turbine engine of claim 11, wherein each stationary outlet guide vane of the plurality of stationary outlet guide vanes defines an outlet at a trailing edge fluidly coupled to the respective OGV internal passage.

13. The gas turbine engine of claim 10, wherein the turbomachine comprises a core cowl and defines an under-cowl duct fluidly coupled to the internal cavity of the nose cone, and wherein the turbomachine comprises a mixer assembly fluidly coupled to the under-cowl duct and an exhaust of the turbomachine for mixing an airflow from the under-cowl duct with an exhaust airflow from the exhaust of the turbomachine.

* * * * *